United States Patent [19]
Waldrop, III

[11] Patent Number: 6,048,581
[45] Date of Patent: *Apr. 11, 2000

[54] ELASTIC GROUND PLANE AND METHOD

[75] Inventor: John Cleveland Waldrop, III, Madrid, Spain

[73] Assignee: McDonnell Douglas Corporation, Huntington Beach, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/718,771

[22] Filed: Sep. 24, 1996

[51] Int. Cl.⁷ .................................. B05D 1/36; B05D 7/00
[52] U.S. Cl. .................. 427/412; 427/389.9; 427/306; 427/413; 427/385.5
[58] Field of Search ........................... 442/168, 229, 442/231, 255, 260, 314, 316, 317, 315; 428/67; 427/304–306, 513, 501, 393.1, 412, 413

[56] References Cited

U.S. PATENT DOCUMENTS

| | | | |
|---|---|---|---|
| 1,810,438 | 6/1931 | Rado | 442/229 |
| 2,687,976 | 8/1954 | Gerke | 442/260 |
| 3,138,517 | 6/1964 | Charbonneau | 442/231 |
| 3,533,831 | 10/1970 | Torti et al. | 442/168 |
| 3,689,354 | 9/1972 | Mamok et al. | 442/168 |
| 3,962,011 | 6/1976 | van Gils | 427/412 |
| 4,002,779 | 1/1977 | Nischwitz | 427/306 |
| 4,263,361 | 4/1981 | Hodes et al. | 442/229 |
| 4,678,681 | 7/1987 | Obayashi et al. | 427/412 |
| 5,035,924 | 7/1991 | Massa et al. | 427/412 |
| 5,222,699 | 6/1993 | Albach et al. | 244/213 |
| 5,279,899 | 1/1994 | Asrar | 427/306 |
| 5,384,185 | 1/1995 | Bovenschen et al. | 442/316 |
| 5,385,774 | 1/1995 | Cramer et al. | 442/260 |
| 5,411,795 | 5/1995 | Silverman | 442/231 |
| 5,422,142 | 6/1995 | Hsu | 427/306 |
| 5,614,301 | 3/1997 | Katz | 442/315 |

*Primary Examiner*—Deborah Jones
*Assistant Examiner*—Cathy F. Lam
*Attorney, Agent, or Firm*—Harness, Dickey & Pierce P.L.C.

[57] ABSTRACT

An elastic ground plane (50) has an environmental coating (58) attached to a surface of a fabric (54) having a lo plurality of fibers. A conductive substance (56) is applied to the fabric (54) to coat the fabric (54).

5 Claims, 3 Drawing Sheets

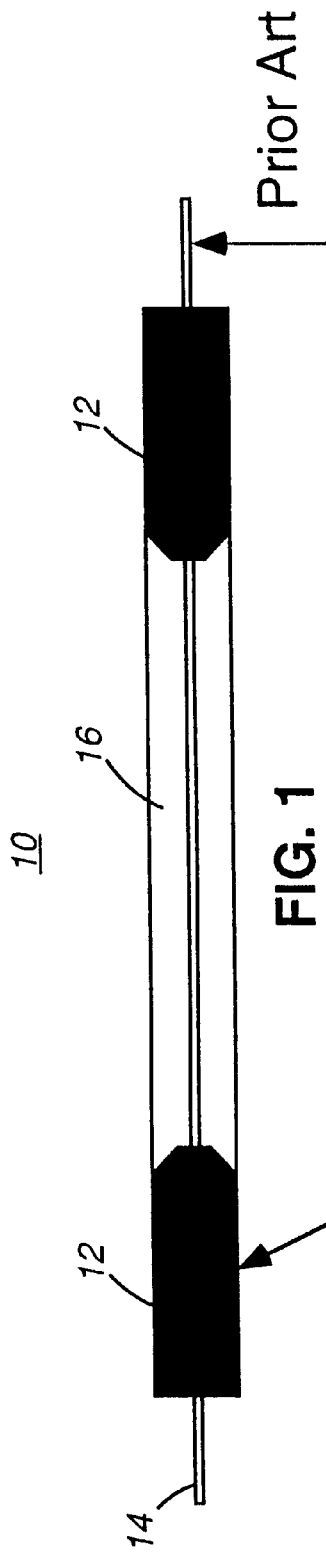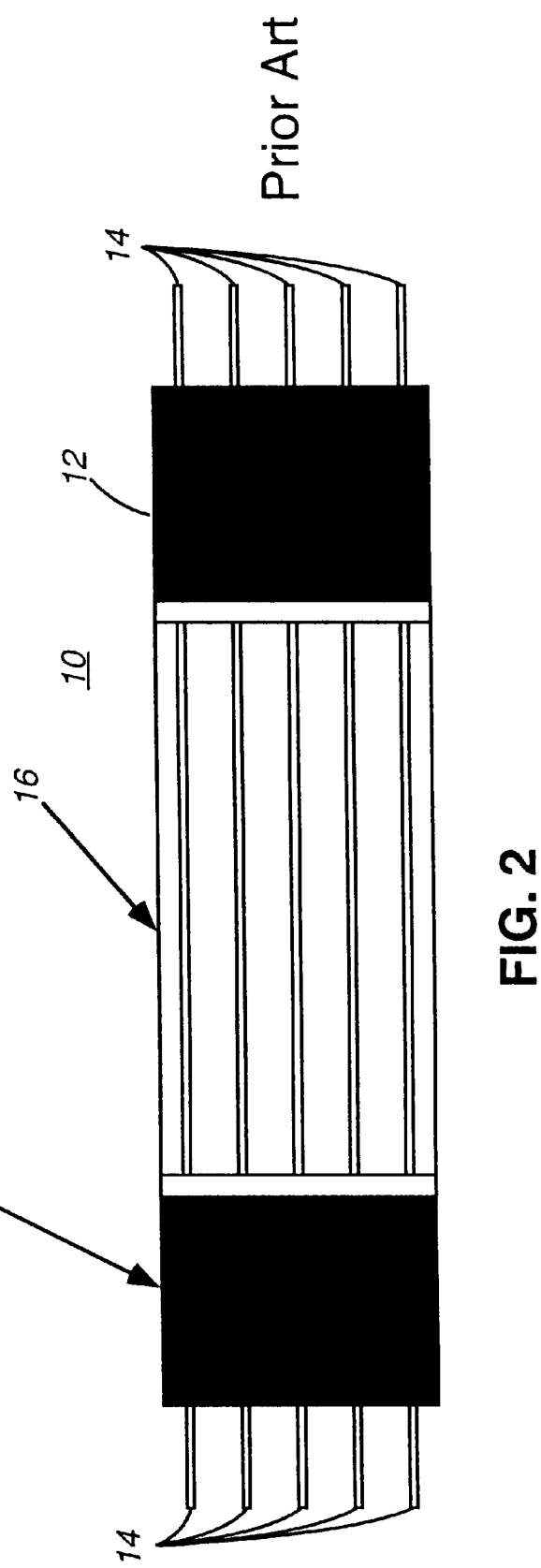

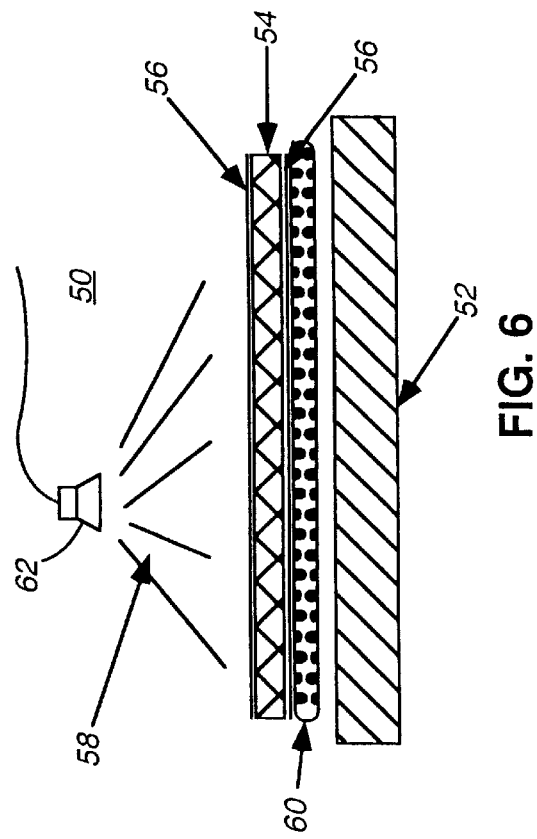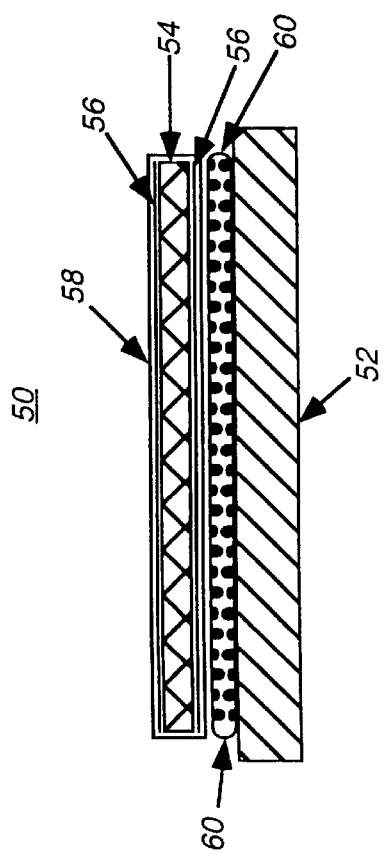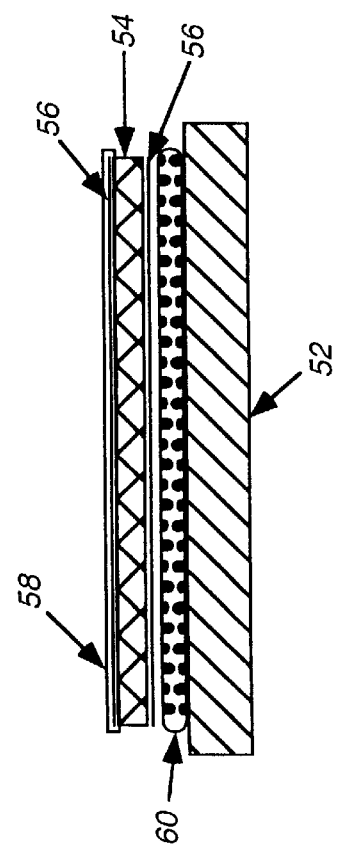

ELASTIC GROUND PLANE AND METHOD

FIELD OF THE INVENTION

The present invention relates generally to the field of stretchable fabrics and more particularly to an elastic ground plane and method.

BACKGROUND OF THE INVENTION

Continuous moldline technology using reinforced elastomers presents an opportunity to improve upon many of the performance characteristics of aircraft and missiles. FIG. 1 shows a side view of a rod reinforced elastomer of the prior art. FIG. 2 is a top view of the rod reinforced elastomer of FIG. 1. The rod reinforced elastomer 10 has a pair of rod blocks 12. A plurality of rods 14 anchored to one of the pair of rod blocks 12 slide inside an elastomer panel 16. The rod reinforced elastomer 10 is capable of both elongation and deflection, as shown in FIG. 3. The rod reinforced elastomer has resting length 22 that can be stretched to an elongated length 24 and deflected a distance 26. These products can be used in applications such as control surfaces and in expandable bays to provide cleaner airflow and reduced drag. However, these products so far have been limited to non-metallic elastomeric compounds that provide little to no protection against electromagnetic interference (EMI). EMI can cause aircraft instruments to malfunction and can result in navigational errors and even the loss of the aircraft.

Conventional EMI shields have been designed as highly conductive metal strips, sprays, and panels that do not possess the ability to flex or elongate repeatedly without material degradation. Recent advances have produced foils that allow a continuous metallic surface with the ability to flex to various shapes. Unfortunately, these foils are limited to applications where elongation is less 10%.

Thus there exists a need for a material that can easily and significantly elongate in all directions, is highly conductive in all states of elongation, can withstand repeated elongations with no degradation in shielding effectiveness or material properties, is thin and light weight, and which is tough enough to withstand severe aerospace environments.

SUMMARY OF THE INVENTION

An elastic ground plane that overcomes these and other problems has an environmental coating attached to a surface of a fabric having a plurality of fibers. A conductive substance is applied to the fabric to coat the fabric.

BRIEF DESCRIPTION OF THE DRAWINGS

FIG. 1 is a side view of a prior art rod reinforced elastomer;

FIG. 2 is a top view of the rod reinforced elastomer of FIG. 1;

FIG. 4 is a side view of an embodiment of an elastic ground plane;

FIG. 5 is a side view of another embodiment of the elastic ground plane; and

FIG. 6 is a side view of another embodiment of the elastic ground plane.

DETAILED DESCRIPTION OF THE DRAWINGS

Figure 3:
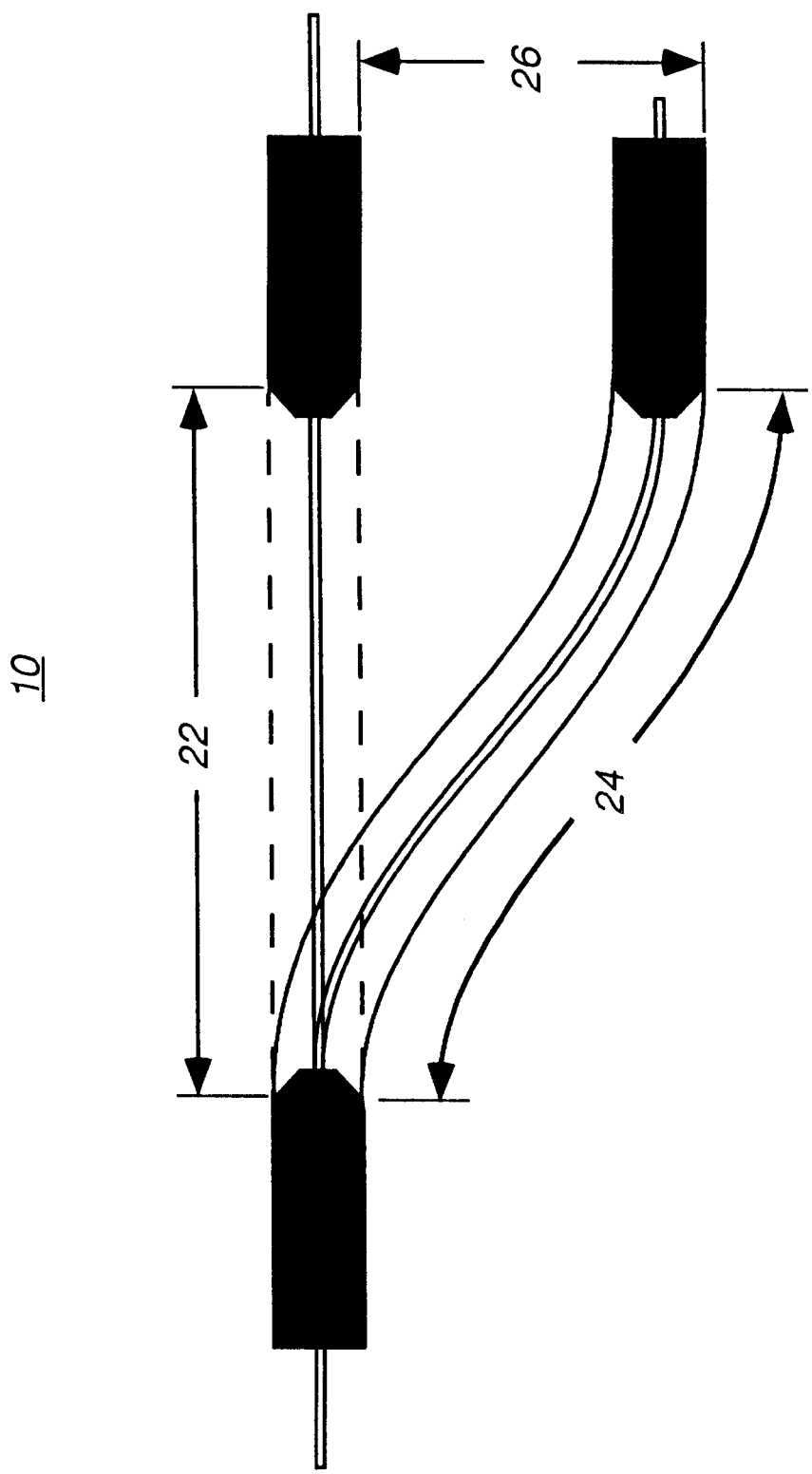
FIG. 3 is a side view of the rod reinforced elastomer of FIG. 1 in an elongated and deflected state.

An embodiment of an elastic ground plane (elastic conductive material) 50 attached to a surface 52 is shown in FIG. 4. The surface 52 could be the rod reinforced elastomer discussed above. Alternatively, the surface could be any surface needing EMI shielding, particularly any surface that tends to stretch or elongate. The elastic ground plane 50 has a fabric 54 containing a plurality of fibers. In one embodiment the fabric is a warp knit fabric (warp knit style weave) made from polyamide fibers. In addition the fabric may contain a small amount of elastic polyurethane fiber (e.g., approximately 10%). The polyurethane or other elastic fiber assists in the recovery of the material after stretching. Note that the invention is not limited to nylon or to warp knit weave as other materials and weaves are available. For instance, tubular knit weaves or other weaves that permit reversible elongation without permanent deformation or fabric damaged can be used and higher temperature resistant materials such as super polyamide, glass, and quartz fibers can be knit when necessary for increased thermal performance. The fabric 54 is coated with a conductive substance by electrolessly plating the fabric 54 in one embodiment. The electroless plating deposits from five to forty percent (by weight) silver, nickel, copper, tin or other metal or combination of metals 56 on the fabric 54. In another embodiment each of the plurality of fibers forming the fabric (plane) 54 are electrolessly plated and then woven. An environmental coating 58 is then applied over the fabric 54. The environmental coating 54 is an elastomeric coating (elastomer) which can be in the form of fluorosilicones, fluorolastomers, silicones, thermoplastic elastomers, urethanes or other viable elastic materials. An elastomeric adhesive (adhesive) 60 is applied to a side of the environmental coating 58 to attach the elastic ground plane to the surface 52.

Tests have shown that the elastic ground plane is capable of a minimum of 100% elongation in all directions at the required operating temperature (operating range) (e.g., −65° to 250° Fahrenheit). The elastic ground plane has a resistance of less than 0.8 Ohms per square, even when elongated and after repeated high strain loading conditions, providing an excellent ground plane. The tensile moduli for the material is less than 1,000 pounds per square inch (PSI) over the operating conditions. A low tensile moduli is important when the elastic ground plane is placed on a rod reinforced elastomer. The low tensile moduli allows the rod reinforced elastomer to be elongated and deflected without requiring a large force to drive the rod reinforced elastomer. Placing the elastic ground plane over the rod reinforced elastomer also increases the tear resistance of the elastomer by two and half times.

FIG. 5 shows an alternative embodiment of the elastic ground plane 50. In this embodiment the fabric (plurality of fibers) 54 only has the environmental coating 58 on the top surface of the fabric 54 (as opposed to encasing the Fabric as in FIG. 4). The elastomeric adhesive is applied to a second surface of the fabric 54 or to the surface 52, to attach the elastic ground plane to the surface 52. FIG. 6 shows a third embodiment of a process for making and applying the elastic ground plane 50. In this embodiment the conductive fabric 54, 56 is prepared first. Next, the conductive fabric 54, 56 is cleaned with a solvent. Then an elastomeric adhesive 60 is applied a surface 52 and the fabric 54 is placed on the adhesive 60. Last, the environmental elastomeric coating is applied by a sprayer 62.

Thus there has been described an elastic ground plane that can easily and significantly elongate in all direction, is highly conductive in all states of elongation, can withstand repeated elongations with no degradation in shielding effectiveness or material properties, is thin and light weight and which is tough enough to withstand severe aircraft environments.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method for forming an elastic ground plane, comprising the steps of:
   (a) preparing a conductive fabric capable of 100% elongation;
   (b) cleaning the conductive fabric with a solvent; and
   (c) applying an elastomeric coating to a first surface of the conductive fabric.

2. The method of claim 1, further including the step of applying an elastomeric adhesive to a second surface of the conductive fabric.

3. The method of claim 1, further including the step of applying an elastomeric adhesive to the elastomeric coating.

4. The method of claim 1, wherein step (a) further includes the step of.
   (a1) electroless plating a fabric with a metal to form the conductive fabric.

5. The method of claim 1, wherein step (a) further includes the step of:
   (a1) plating a plurality of fibers with a metal:
   (a2) weaving the plurality of fibers to form the conductive fabric.

* * * * *